May 6, 1924.
W. S. ALLEN
AUTOMOBILE HEADLIGHT
Filed Oct. 19, 1922
1,492,620
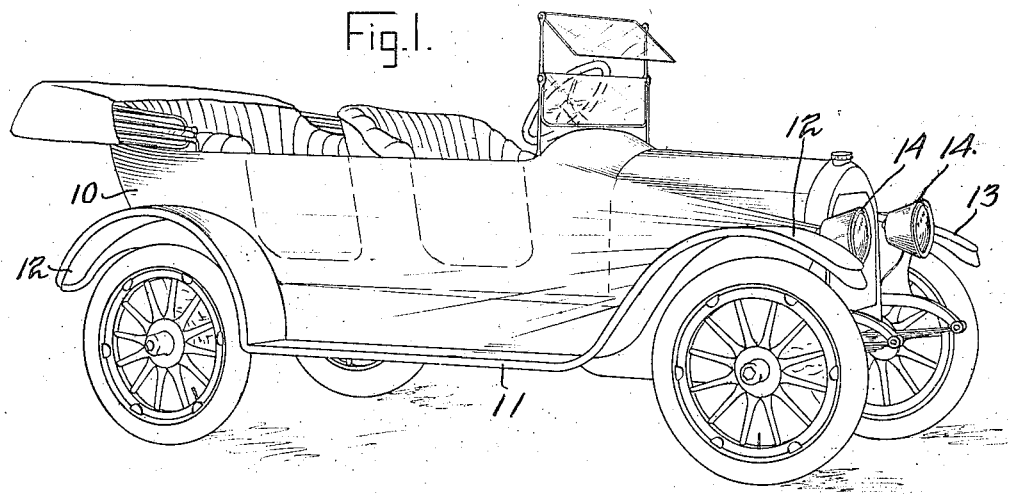
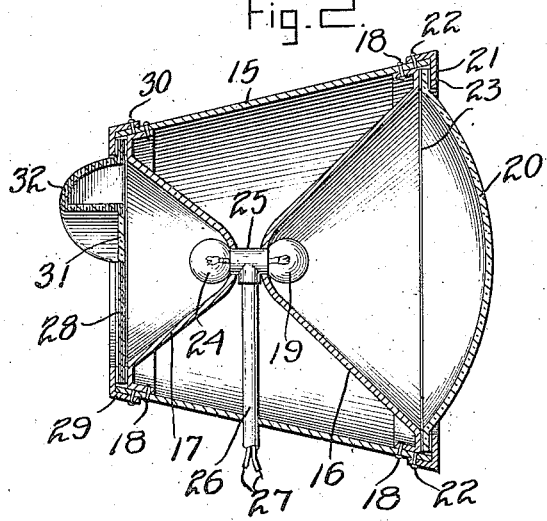
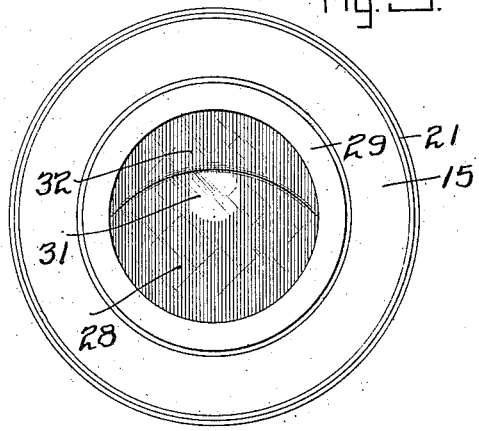
Inventor
William S. Allen.

Patented May 6, 1924.

1,492,620

UNITED STATES PATENT OFFICE.

WILLIAM SAYRE ALLEN, OF BIRMINGHAM, ALABAMA.

AUTOMOBILE HEADLIGHT.

Application filed October 19, 1922. Serial No. 595,585.

*To all whom it may concern:*

Be it known that I, WILLIAM SAYRE ALLEN, a citizen of the United States, residing at Birmingham, in the county of Jefferson and State of Alabama, have invented certain new and useful Improvements in Automobile Headlights, of which the following is a specification.

My said invention relates to a headilght for automobiles and similar vehicles and it is an object of the invention to provide means for projecting light rays against the side of the automobile body. It is well known that one of the fruitful sources of collisions arises from the inability of drivers to see a machine which is crossing or about to cross their path. This is due largely to the fact that when driving after dark the headlights for such machines are not readily seen, as when a machine turns across the path of another or comes out of an intersecting street particularly where the streets cross at an acute angle. As is well known the body of the machine under such circumstances is ordinarily very inconspicuous, this being partly due to the fact that most automobile bodies are painted black, and in fact other colors such as red and purple are almost equally hard to see after dark.

A further object is to light up the running board and rear fender for the convenience of persons entering or alighting from automobiles. This feature is made more desirable by the recent fashion of omitting the running board and substituting one or two narrow steps therefor by which the danger of injury is greatly increased. A further and minor object of the device is to provide a certain amount of light at the rear end of the machine for convenience in working on rear tires, etc. In order to be useful for this purpose it is not necessary for the light to fall directly on the object as the mere diffusion of light from a beam of light falling near by will often be of considerable assistance.

Still another object is to light up the road alongside the vehicle to some extent, so that the driver can judge his distance from the ditch, this being especially desirable on narrow roads as in backing the machine or in passing other vehicles.

Referring to the accompanying drawings, which are made a part hereof and on which similar reference characters indicate similar parts, Figure 1 is a perspective of an automobile provided with my improved headlights, Figure 2 a vertical central section through one of said headlights, and Figure 3 a front elevation of a headlight.

In the drawings reference character 10 indicates the body of an automobile having a running board 11 and rear fenders 12. Adjacent the front fenders 13 there are mounted a pair of headlights 14.

Each headlight is provided with an outer shell or casing 15 in which are secured a pair of reflectors 16 and 17 by means of screws 18 passing through flanges integral with the reflectors. These flanges are concentric with the body 15 and fit closely therein to hold the reflector securely in place. The front reflector is somewhat conical in shape and is provided at its apex with a source of illumination here shown as an electric lamp 19. In front of the lamp a convex lens 20 preferably of yellow glass is provided and this is held in place by a cap 21 secured to the shell 15 by screws 22. Rubber washers 23 are provided at the outer edge of the lens beyond the convex portion and these washers serve to cushion the lens and prevent breakage thereof.

The second reflector 17 is also conical in shape with its apex adjacent that of the first and is provided with a lamp 24 at the apex. A common holder 25 is provided for the two lamps and a common source of electricity comprising a casing 26 and a pair of wires 27 enters the shell at the bottom and is secured in conventional manner to the holder 25. A flat lens 28 is provided at the rear end of the shell 15 being held in place by a cap 29 also secured to the shell by means of screws 30. The reflector and its washers are similar to those at the front of the device and are similarly secured in place. The rear lens, however, preferably consists of red glass having a clear portion at 31 so arranged that the white light from the lamp 24 will fall on the side of the car body and on the running board and rear fender as illustrated in Figure 1. With this construction the light will appear all red from the rear and if properly located may under some circumstances render it possible to dispense with the ordinary tail lights. This would be advantageous where feasible since the driver will have one or both of the rearwardly directed lights in view and can see whether or not they are functioning properly. An overhanging bulge is provided at 32 in the lens, this bulge consisting also of colored glass and being intended to prevent the white light from shining into the eyes of the driver.

I have shown and described a preferred form of the invention but numerous changes therein will be obvious to those skilled in the art. For example I may change the colors of the lenses and the conformation of various parts. The bulged portion of lens 28 in particular may be varied in shape and otherwise so long as it fulfills its purpose of shielding the driver's eyes. Therefore I do not limit myself to the precise embodiment of the invention shown and described but only as indicated in the appended claim.

Having thus fully described my said invention, what I claim as new and desire to secure by Letters Patent, is:

An automobile headlight comprising a casing, a forwardly and a rearwardly directed reflector within the casing for directing rays of light along the path of travel and against the vehicle body respectively, means for mounting a lamp adjacent each reflector, a lens for the forwardly directed reflector and a lens for the rearwardly directed reflector said last named lens constructed of colored transparent material having an overhanging bulge adjacent the casing, said lens having a colorless transparent portion below the said overhanging bulge, and means at each end of the casing for securing thereto a reflector and lens, substantially as set forth.

In witness whereof, I have hereunto set my hand and seal at Birmingham, Alabama, this 11th day of October, A. D. nineteen hundred and twenty-two.

WILLIAM SAYRE ALLEN. [L. S.]

Witnesses:
  H. D. BREEDING,
  J. W. MILLER.